US008099206B2

(12) United States Patent
Shin et al.

(10) Patent No.: US 8,099,206 B2
(45) Date of Patent: Jan. 17, 2012

(54) COMBINED EVIDENCE VEHICLE HEALTH MONITORING

(75) Inventors: Kwang-Keun Shin, Rochester Hills, MI (US); Mutasim A. Salman, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 614 days.

(21) Appl. No.: 12/257,821

(22) Filed: Oct. 24, 2008

(65) Prior Publication Data

US 2010/0106357 A1 Apr. 29, 2010

(51) Int. Cl.
*G01M 17/00* (2006.01)
*G06F 7/00* (2006.01)

(52) U.S. Cl. ............... 701/29; 701/22; 701/36; 340/455

(58) Field of Classification Search .................... 701/22, 701/29, 36; 340/425.5, 438, 439, 455; 903/903
See application file for complete search history.

(56) References Cited

U.S. PATENT DOCUMENTS

| | | | | |
|---|---|---|---|---|
| 7,337,086 | B2 * | 2/2008 | Guralnik et al. | 702/113 |
| 7,928,735 | B2 * | 4/2011 | Huang et al. | 324/426 |
| 2005/0154509 | A1 * | 7/2005 | Schubert et al. | 701/29 |
| 2009/0138423 | A1 * | 5/2009 | Nwadiogbu et al. | 706/46 |
| 2009/0222399 | A1 * | 9/2009 | Gomez et al. | 706/52 |
| 2009/0295559 | A1 * | 12/2009 | Howell et al. | 340/459 |

* cited by examiner

*Primary Examiner* — Sarah B McPartlin

(57) ABSTRACT

A method is provided for fusing a plurality of self-contained diagnostics for generating a combined state of belief for a monitored system. A plurality of predetermined diagnostic states of self-contained diagnostic routines is executed. Each self-contained routine generates a respective state of belief result for the monitored system. Respective belief vectors are formulated as a function of belief results. A state space is provided that includes a plurality of sub-state spaces. Each of the sub-state spaces is representative of the predetermined diagnostic states of the monitored system. Belief vectors are assigned to the sub-state spaces of the state space. Belief vectors relating to each sub-state space are fused. A combined belief value is determined for each fused sub-state space. The sub-state space having the highest combined belief value is indicated in response to the determined probabilities as the actual diagnostic state of the monitored system.

20 Claims, 7 Drawing Sheets

Table 1

| Subsets of Θ | Hypothesis | Index | Belief Mass |
|---|---|---|---|
| $\phi$ | Impossible | 0 | m($\phi$) = 0 |
| {Replace) | Replace | 1 | m({Replace}) |
| {Charge} | Charge | 2 | m({Charge}) |
| {Charge, Replace} | Not Good | 3 | m({Charge, Replace}) |
| {Good} | Good | 4 | m({Good}) |
| {Good, Replace} | No Charge | 5 | m({Good, Replace}) |
| {Good, Charge} | No Replace | 6 | m({Good, Charge}) |
| {Good, Charge, Replace} | Unknown | 7 | m({Good, Charge, Replace}) |

Fig. 3

Table 2

| Notation | Subsets of Θ | Charge | Charge | Charge | Charge |
|---|---|---|---|---|---|
| $A_0$ | $\phi$ | 0 | 0 | 0 | 0 |
| $A_1$ | {Replace) | 0 | 0 | 1 | 1 |
| $A_2$ | {Charge} | 0 | 1 | 0 | 2 |
| $A_3$ | {Charge, Replace} | 0 | 1 | 1 | 3 |
| $A_4$ | {Good} | 1 | 0 | 0 | 4 |
| $A_5$ | {Good, Replace} | 1 | 0 | 1 | 5 |
| $A_6$ | {Good, Charge} | 1 | 1 | 0 | 6 |
| $A_7$ | {Good, Charge, Replace} | 1 | 1 | 1 | 7 |

Fig. 4

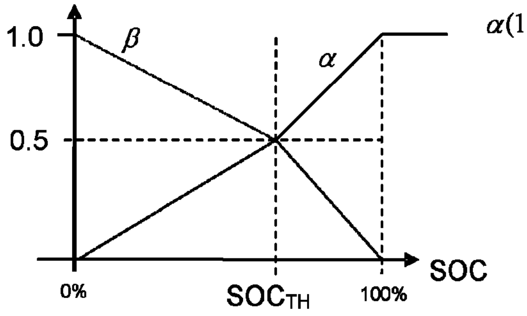
Fig. 8
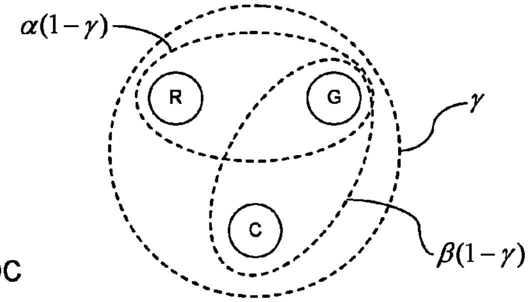
Fig. 9
Table 3
| Subsets of Q | Hypothesis | Index | Belief Vector | Example: γ=0.1 $SOC_{TH}$=60%, SOC=80% |
|---|---|---|---|---|
| $\phi$ | Impossible | 0 | *0* | 0 |
| {Replace) | Replace | 1 | *0* | 0 |
| {Charge} | Charge | 2 | *0* | 0 |
| {Charge, Replace} | Not Good | 3 | *0* | 0 |
| {Good} | Good | 4 | *0* | 0 |
| {Good, Replace} | No Charge | 5 | $\alpha(1-\gamma)$ | 0.625 |
| {Good, Charge} | No Replace | 6 | $\beta(1-\gamma)$ | 0.225 |
| {Good, Charge, Replace} | Unknown | 7 | $\gamma$ | 0.1 |
Fig. 10

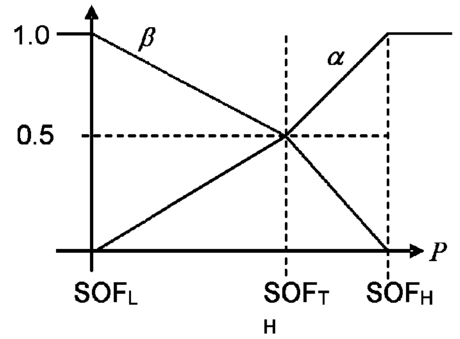
Fig. 11
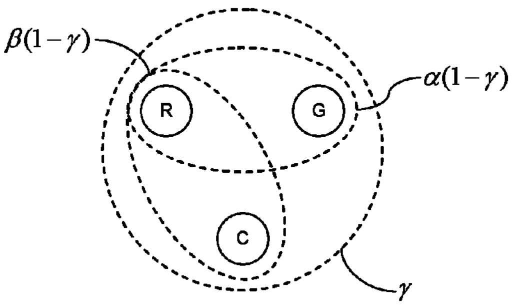
Fig. 12
Table 4
| Subsets of Q | Hypothesis | Index | Belief Vector | Example: $\gamma$=0.1 SOF=50%, $SOF_{TH}$=10%, $SOF_L$=0% $SOF_H$=100% |
|---|---|---|---|---|
| $\phi$ | Impossible | 0 | *0* | 0 |
| {Replace) | Replace | 1 | *0* | 0 |
| {Charge} | Charge | 2 | *0* | 0 |
| {Charge, Replace} | Not Good | 3 | $\beta(1-\gamma)$ | 0.25 |
| {Good} | Good | 4 | *0* | 0 |
| {Good, Replace} | No Charge | 5 | $\alpha(1-\gamma)$ | 0.65 |
| {Good, Charge} | No Replace | 6 | 0 | 0 |
| {Good, Charge, Replace} | Unknown | 7 | $\gamma$ | 0.1 |
Fig. 13

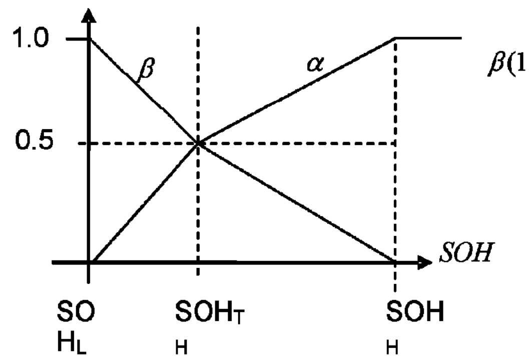
Fig. 14
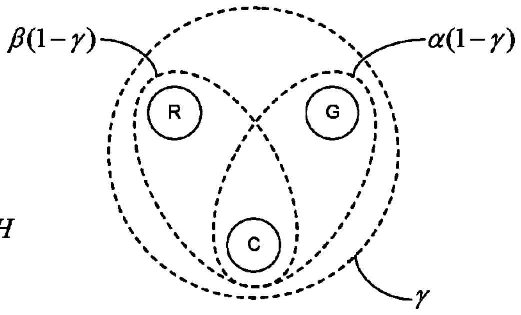
Fig. 15
Table 5
| Subsets of Q | Hypothesis | Index | Belief Vector | Example: $\gamma$=0.1 SOH=20%, $SOH_{TH}$=10%, $SOH_L$=0% $SOH_H$=100% |
|---|---|---|---|---|
| $\phi$ | Impossible | 0 | *0* | 0 |
| {Replace) | Replace | 1 | *0* | 0 |
| {Charge} | Charge | 2 | *0* | 0 |
| {Charge, Replace} | Not Good | 3 | $\beta(1-\gamma)$ | 0.64 |
| {Good} | Good | 4 | *0* | 0 |
| {Good, Replace} | No Charge | 5 | 0 | 0 |
| {Good, Charge} | No Replace | 6 | $\alpha(1-\gamma)$ | 0.26 |
| {Good, Charge, Replace} | Unknown | 7 | $\gamma$ | 0.1 |
Fig. 16

COMBINED EVIDENCE VEHICLE HEALTH MONITORING

BACKGROUND OF INVENTION

An advantage of an embodiment of the invention is the use of various vehicle sub-system monitoring algorithms and the fusing of the results of each of the monitoring algorithms for providing a robust and reliable result.

As the number of vehicle features increase in addition to the vehicle function complexity increasing, vehicles are exposed to more fault and reliability degradation as a result of the additional function and complexity. As a result of the increase of vehicle features and function complexity, various on-board health monitoring diagnostics are provided for monitoring the respective sub-systems. Due to the limited number of sensors and other measurement devices, many algorithms indirectly infer health of the sub-systems using information obtained from the limited number of sensors and other measurement devices. The respective algorithms process the signals from available measurements and extract some signatures indicating sub-system health. Each algorithm may monitor different aspects of a sub-system in an attempt to ascertain health of the sub-system. Each algorithm provides health information related to the health of the sub-system but involves some degree of uncertainty. Each algorithm is based on different standards which may not be directly comparable to one another. Therefore, the combination of the results of the algorithm on their face are non-comparable due to the different standards uses and are difficult to reduce the uncertainty of the each of the results of the algorithms individually and in combination.

SUMMARY OF INVENTION

An advantage of an embodiment is the combination of the results of various vehicle sub-system health monitoring algorithms which reduces errors and uncertainties commonly associated with the results of an individual vehicle sub-system health monitoring algorithm.

An embodiment contemplates a method for fusing a plurality of self-contained diagnostics for generating a combined state of belief for a monitored system. A plurality of predetermined diagnostic states of self-contained diagnostic routines is executed. Each self-contained routine generates a respective state of belief result for the monitored system. Respective belief vectors are formulated as a function of belief results of the executed plurality of predetermine diagnostic states. A state space is provided that includes a plurality of sub-state spaces. Each of the sub-state spaces is representative of the predetermined diagnostic states of the monitored system. Belief vectors are assigned to the sub-state spaces of the state space. Belief vectors relating to each sub-state space is fused. A combined belief value is determined for each fused sub-state space. The combined belief values of each fused sub-state space are compared. The sub-state space having the highest combined belief value is indicated in response to the determined probabilities as the actual diagnostic state of the monitored system.

An embodiment contemplates a diagnostic system for vehicle-related system. At least one sensor is provided for monitoring a characteristic of a vehicle-related sub-system. A processing unit executes a plurality of vehicle system-related monitoring routines. The processing unit identifies a state of belief for each monitoring routine and assigns a belief vector to the plurality of battery sub-state spaces within a state space. A fusing framework combines the results of each of the executed monitoring routines for each respective sub-state space. The fusing framework determines a combined belief value of each fused sub-state space. The fusing framework identifies the sub-state having the highest combined belief value.

BRIEF DESCRIPTION OF DRAWINGS

FIG. 3 is a table listing of possible subsets of a state space according to the embodiment of the invention.

FIG. 4 is a table listing illustrating a binary mapping for each of the subsets of the state space according to the embodiment of the invention.

FIG. 8 is a SOC basic belief assignment graph according to the embodiment of the invention.

FIG. 9 is a basic belief mapping the of SOC algorithm assignments according to the embodiment of the invention.

FIG. 10 is a table listing of the basic belief assignments of the SOC algorithm according to the embodiment of the invention.

FIG. 11 is a SOF basic belief assignment graph according to the embodiment of the invention.

FIG. 12 is a basic belief mapping the of SOF algorithm assignments according to the embodiment of the invention.

FIG. 13 is a table listing of the basic belief assignments of an SOF algorithm according to the embodiment of the invention.

FIG. 14 is a SOH basic belief assignment graph according to the embodiment of the invention.

FIG. 15 is a basic belief mapping the of SOH algorithm assignments according to the embodiment of the invention.

FIG. 16 is a table listing of the basic belief assignments of an SOH algorithm according to the embodiment of the invention.

DETAILED DESCRIPTION

Figure 1:
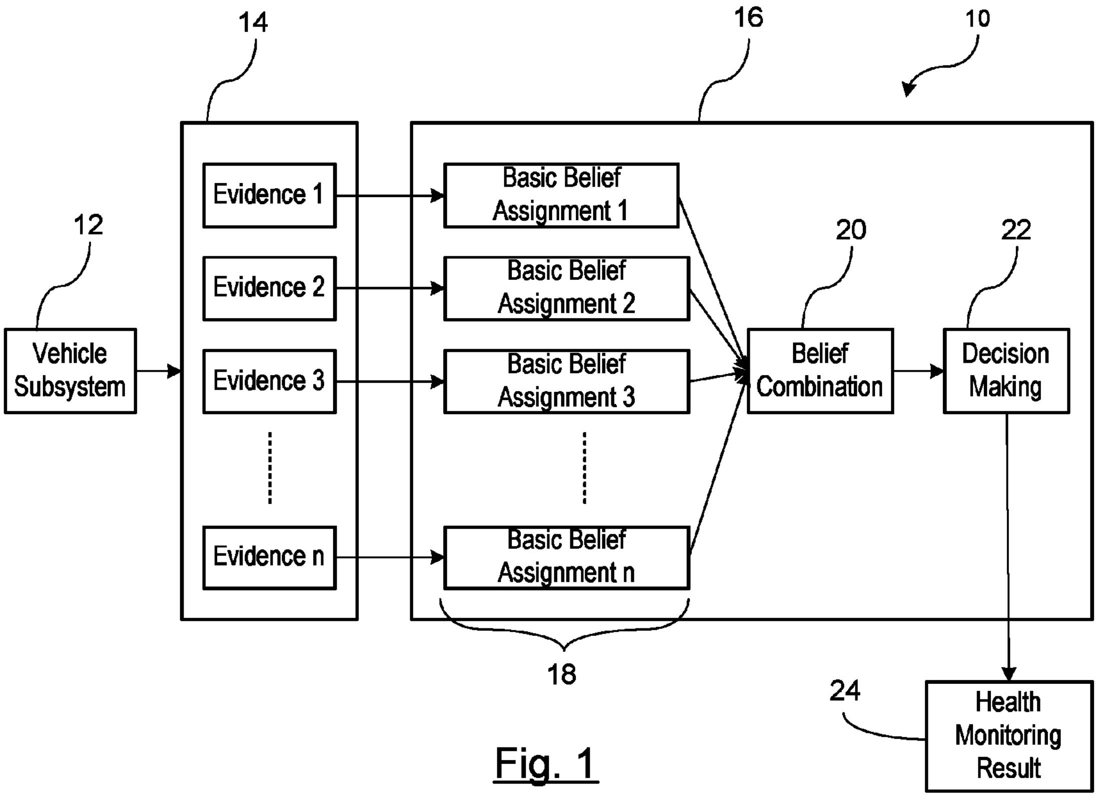
FIG. 1 is a block diagram of a vehicle sub-system health monitoring diagnostic.

FIG. 1 is a block diagram 10 of an decision making process that fuses the results of a various health sub-system monitoring algorithms for providing a unified result that reduces uncertainty and error in the algorithms. A vehicle sub-system 12 is monitored for determining the health of the vehicle sub-system 12. The sub-system 12 may include any vehicle sub-system within the vehicle. Various signals are collected by sensors and other measurement devices and are used to monitor the health of the sub-system 12.

A plurality of algorithms 14 are provided for extracting the evidence relating the health of the sub-system 12 as determined by each respective algorithm. Each of the sensors and measurement devices provides evidentiary information (i.e., evidence) used by the algorithm for determining a hypothesis of the sub-system's health. Each algorithm has different coverage and some associated degree of uncertainty or error in its results. Each algorithm may be executed by one or more processors.

The results of each algorithm are provided to an evidence fusion framework 16 for processing and fusing (e.g., combining) the various results of each of the plurality of algorithms for determining a unified belief of the health monitored sub-system. Basic beliefs 18 are assigned to each hypothesis based on the results of the each executed algorithm. The output of each belief assignment is a belief vector. The belief vectors are vectors of all possible hypotheses and their associated belief values.

The belief vectors are provided to a belief combination processing block 20 for generating a combined belief vector. Each belief vector is converted to a standard that is combinable for producing unified results that are comparable to one another.

The belief combinations produced by the belief combination processing block 20 is provided to a decision making block 22. In the decision making block 22, each of the combined beliefs are compared to one another for determining which respective combined belief most accurately reflects the health of the monitored sub-system. In decision block 24, the health monitoring result is generated for identifying the monitored sub-system's state of health. The health status is then used by a vehicle subsystem for generating an action or notifying the driver of the health status of the battery.

Figure 2:
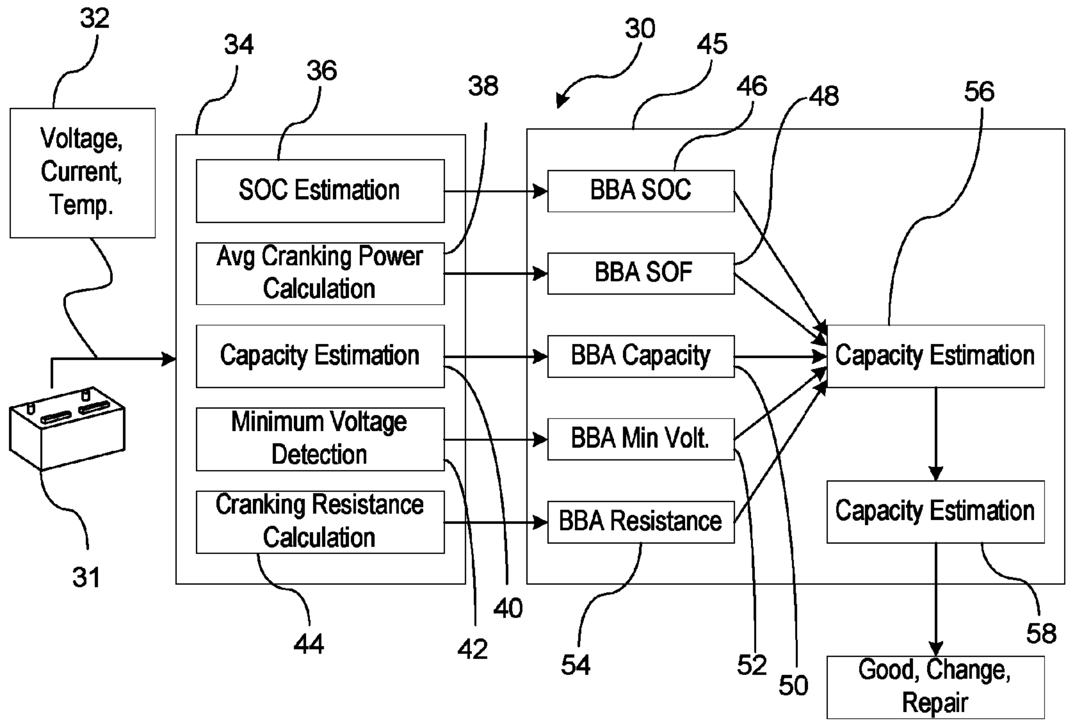
FIG. 2 is a block diagram of a state of health battery sub-system diagnostic according to an embodiment of the invention.

FIG. 2 illustrates an embodiment of a block diagram 30 for monitoring a state of health battery sub-system. It should be understood that the embodiment described herein, is for illustrative purposes, and the monitored health sub-system may be any vehicle sub-system and not limited only to battery sub-systems. In block 30, a battery health monitoring system is provided for monitoring health of a battery 31. Various battery and vehicle operating characteristics 32 may be used to determine the health of the battery 31. It is understood that a respective algorithm used for monitoring the health of the battery may utilize a single battery characteristic or more than one battery characteristic in combination. Such characteristics may include, but is not limited to, voltage, current, and temperature.

The battery operating characteristics are provided to a plurality of battery health algorithms 34. Each battery health algorithm identifies a hypothesized health belief of the health of the battery. Examples of the battery health algorithms may include, but are not limited to, state of charge (SOC) monitoring algorithms 36, and state of function (SOF) monitoring algorithms 38, state of health (SOH) monitoring algorithms such as capacity estimation monitoring algorithms 40, minimum voltage monitoring algorithms 42, cranking resistance and monitoring algorithms 44. The various algorithms produce different decisions regarding the health state of the battery. Since a single algorithm may not be able to detect all different aspects of the battery health, uncertainty and errors are produced in each result.

A battery health monitoring fusion framework is shown generally at 45. Basic belief assignments (BBA) are generated such as BBA SOC 46, BBA SOF 48, BBA capacity 50, BBA minimum voltage 52, and BBA resistance 54. Belief vectors are produced from each respective basic belief assignment and are provided to a belief combination processing block 56. In block 56, respective vectors are combined. The combined belief vectors are then provided to a health decision processing block 58 for determining health status of the battery 31 as a result of the combined belief vectors. The health status is then used by a vehicle sub-system for generating an action or notifying the driver of the health status of the battery. In summary, the battery health monitoring diagnostic reduces the uncertainty and errors by converting the results of each algorithm into a standard that is both combinable and comparable for making a higher confidence decision in comparison to a single algorithm by taking into account each of the battery health monitoring algorithms.

The final output of the battery health monitoring diagnostic, in the embodiment described herein, identifies the condition of the battery as either "good", "charge", or "replace". It should be understood that the number or types of outputs of the health monitoring diagnostic may be more or less than that described herein. Furthermore, the processing of the algorithms and the fusing framework may by one or more modules or may be integrated into a single module such as a battery control module.

The following describes the mathematical structure of the health monitoring diagnostic. In the example described above for the health state of a battery, a set of mutually exclusive and exhaustive hypothesis (Θ) may be determined from three possible conditions (i.e., good, charge, or replace). That is, the number of subsets of a hypothesis is dictated by the number of possible conditions. For n number of conditions, the potential subsets are determined by $2^n$. Therefore, if n=3 (i.e., good, charge, replace), then the number of possible subsets is 8. The list of subsets including combination subsets are shown in table 1 shown in FIG. 3.

The effect of each distinct evidence generated by health monitoring algorithm of the subsets of Θ is represented basic belief assignments (BBA). The BBA assigns a number in the range of [0,1] to every subset of Θ shown above. The summation of each of the subsets of Θ is equal to 1. This is represented by the following formula:

$$\sum_{A\subset\Theta} m(A) = 1 \quad (1)$$

where A represents the designated belief values within the respective subset Θ.

Each of the subsets is assigned one or more beliefs. For example, in table 1, the subset {Charge, Replace} is interpreted as the hypothesis that the battery state is not good but it is not entirely sure whether the battery needs charging or replacing. Similarly, the subset {'Good', 'Charge', 'Replace'} is interpreted as a hypothesis that the battery state is unknown because it could be any of the three states. The result of each battery health monitoring algorithm is considered to be the evidence that supports one or more hypotheses of the state of the battery's health. From the results of each health monitoring algorithm, values identified as belief mass are assigned to each of the subsets of Θ. The belief mass is associated as the level of confidence that the evidence supports each hypothesis. The belief mass should meet the conditions in equations (1) such that the confidence level for the entire subsets of Θ equals 1. The belief mass of empty set ϕ should be zero because it cannot happen meaning there has to be either a good, charge, replace or some combination.

The basic belief assignment (BBA) is a function that maps a signature (i.e., evidences) detected from each algorithm to a belief vector. Each signature has a different standard, or meaning, or engineering unit, or scale, and is not readily comparable to other signatures from other algorithms. A respective belief vector is derived from a respective BBA. The belief vector is defined as a vector of belief mass as it relates to the respective belief mass and is a value that is designed based on the knowledge and experience of each algorithm.

Once the signatures (i.e., evidences) are detected from the battery health monitoring algorithms, the battery health monitoring diagnostic converts the signature into a belief vector through BBA process. The belief vectors from different algorithms have the same mathematical structure that provides a more manageable standard for comparison to one another. The belief vector is vector of numbers between 0 and 1, where each number is assigned to the subsets of hypothesis. The sum of the numbers in a belief vector should be equal to 1. The belief vectors from different algorithms may be combined by certain way, which will be discussed in detail later, to fuse the information contained in the belief vectors. This process is known as evidence combination. This concept of evidence combination is the transformation of a large body of evidence from many sources, such as that from various health monitoring algorithms, into manageable standard (e.g., belief vectors) for combining different structures of evidence together to produce an accumulative result that reduces the uncertainty and errors associated with health monitoring algorithms. In summary, the battery health monitoring diagnostic generates belief vectors constructed from different battery health monitoring algorithms for forming a combined belief vector. Each of the fused belief vectors are compared within one another or to a predetermined threshold for making a health decision of the battery.

The BBA structures can be combined by the Dempster's rule of combination in order to make the combined BBA as shown in Equation (2).

$$(m_1 \oplus m_2 \oplus \ldots m_n)(\phi) = 0, \tag{2}$$

and $$(m_1 \oplus m_2 \oplus \ldots m_n)(A) = \frac{\sum\limits_{B \cap C \cap \ldots \cap X = A} m_1(B) m_2(C) \ldots m_n(X)}{1 - \sum\limits_{B \cap C \cap \ldots \cap X = \phi} m_1(B) m_2(C) \ldots m_n(X)}, \tag{3}$$

$$A \neq \phi$$

where $m_1$, $m_2$, $m_n$ represents the various belief vectors, and where A, B, C, . . . , $X \subset \Theta$.

Dempster's rule of combination as shown in equation (2) can be reconfigured to make it more manageable. Consider the combination of two belief vectors $m_1$ and $m_2$:

$$(m_1 \oplus m_2)(\phi) = 0 \tag{4}$$

and $$(m_1 \oplus m_2)(A) = \frac{\sum\limits_{B \cap C = A} m_1(B) m_2(C)}{1 - \sum\limits_{B \cap C = \phi} m_1(B) m_2(C)}, A \neq \phi \tag{5}$$

where $A, B, C \subset \Theta$.

For notational convenience, let us define a truth function $\delta(\bullet)$ such that: $\delta(\bullet)=1$ if its argument is true and $\delta(\bullet)=0$ if its argument is false. Then the following expression holds:

$$\sum_{B \cap C = A} m_1(B) m_2(C) = \sum_C \sum_B m_1(B) m_2(C) \delta(B \cap C = A) \tag{6}$$

therefore, equation (5) may be re-written as:

$$(m_1 \oplus m_2)(A) = \frac{\sum\limits_C \sum\limits_B m_1(B) m_2(C) \delta(B \cap C = A)}{1 - \sum\limits_C \sum\limits_B m_1(B) m_2(C) \delta(B \cap C = \phi)}. \tag{7}$$

The denominator of the right hand side of equation (7) can be further simplified. Since $$\sum_{B \subset \Theta} m_1(B) = 1 \text{ and } \sum_{C \subset \Theta} m_1(C) = 1,$$

following equation holds:

$$\begin{aligned} 1 &= \sum_C \sum_B m_1(B) m_2(C) \\ &= \sum_C \sum_B m_1(B) m_2(C) \{\delta(B \cap C = \phi) + \delta(B \cap C \neq \phi)\} \\ &= \sum_C \sum_B m_1(B) m_2(C) \delta(B \cap C = \phi) + \\ &\quad \sum_C \sum_B m_1(B) m_2(C) \delta(B \cap C \neq \phi) \\ &= \sum_C \sum_B m_1(B) m_2(C) \delta(B \cap C = \phi) + \\ &\quad \sum_A \sum_C \sum_B m_1(B) m_2(C) \delta(B \cap C = A), \end{aligned} \tag{8}$$

therefore, $$1 - \sum_C \sum_B m_1(B) m_2(C) \delta(B \cap C = \phi) = \sum_A \sum_C \sum_B m_1(B) m_2(C) \delta(B \cap C = A). \tag{9}$$

Consequently, the combination of two belief vectors is expressed as $$(m_1 \oplus m_2)(A) = \frac{\sum\limits_C \sum\limits_B m_1(B) m_2(C) \delta(B \cap C = A)}{\sum\limits_A \sum\limits_C \sum\limits_B m_1(B) m_2(C) \delta(B \cap C = A)}, A \neq \phi \tag{10}$$

The combination operator $\oplus$ in equation (10) can be realized utilizing a computer algorithm. To make it computationally suitable, orders are assigned on the subsets of $\Theta$. In the embodiment of battery health monitoring, the subsets of $\Theta$ are differentiated by having or not having each subset elements of $\Theta$. Table 2, shown in FIG. 4, illustrates whether each subset includes 'Good', 'Charge', or 'Replace' as one of its elements. For example, the second column indicates 1 if 'Good' is an element of the subset in the first column, and 0 otherwise. For notational simplicity, therefore, we can assign orders to the set of $\Theta$ such that $A_0=\phi$, $A_1=\{\text{Replace}\}$, $A_1=\{\text{Replace}\}$ and so forth.

Using the notation in table 2, the operator $\oplus$ in equation (10) can be re-written as:

$$(m_1 \oplus m_2)(A_k) = \frac{\sum_j \sum_i m_1(A_i) m_2(A_j) \delta(A_i \cap A_j = A_k)}{\sum_k \sum_j \sum_i m_1(A_i) m_2(A_j) \delta(A_i \cap A_j = A_k)}, \quad k \neq 0 \tag{11}$$

Moreover, the truth function $\delta(A_i \cap A_j = A_k)$ can be easily realized in the computer algorithm. For example, the binary number for $A_5$ is 101 and the binary number for $A_3$ is 011. The binary number for the intersection $A_5 \cap A_3$ is the result of bitwise AND of the two binary numbers 101 and 011. Indeed the binary number for $A_5 \cap A_3$ is 001 which corresponds to $A_1$. Therefore the realization of truth function is as follows:

$$\delta(A_i \cap A_j = A_n) = \begin{cases} 0, & \text{if binary}(i)\ \&\ \text{binary}(j) \neq \text{binary}(k) \\ 1, & \text{if binary}(i)\ \&\ \text{binary}(j) = \text{binary}(k) \end{cases} \tag{12}$$

Figure 5:
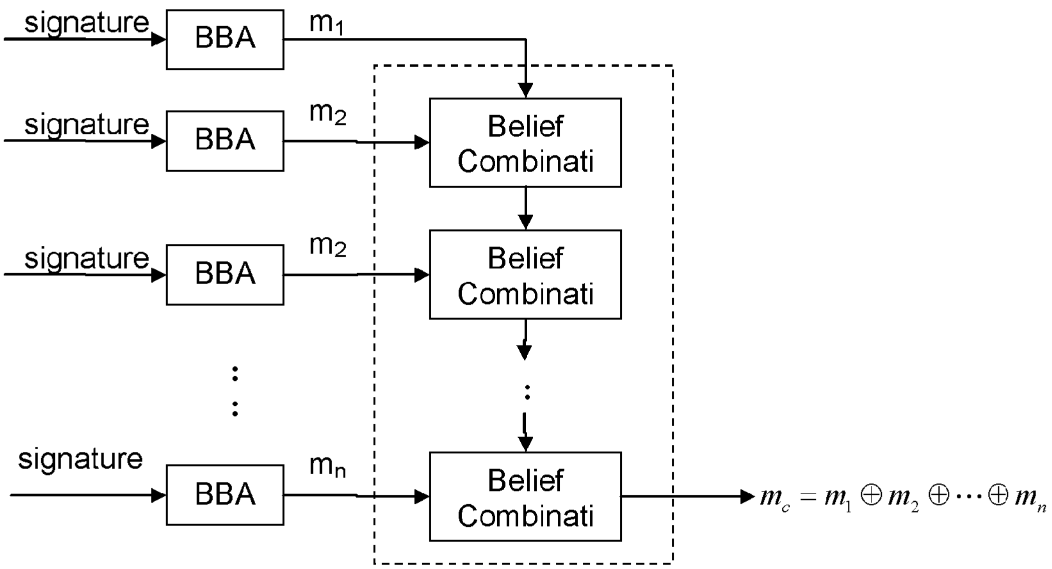
FIG. 5 is a block diagram of a belief combination schematic according to the embodiment of the invention.

FIG. 5 shows a block diagram schematic of belief combination. As discussed above, the order or combination does not affect the result.

Once the belief vectors are combined, the outcome is realized as a combined belief vector $m_C = m_1 \oplus m_2 \oplus \ldots m_n$. A decision is made to identify the health status of the battery as 'Replace', 'Charge', or 'Good' in response to the values of the combined belief vectors. This process is called decision making and is described in terms of the concept of belief and plausibility. The following is a mathematical concept of the belief and plausibility concept:

$$Bel(A) = \sum_{B \subseteq A} m(B). \tag{13}$$

$$Pl(A) = 1 - Bel(\overline{A}) = \sum_{B \cap A \neq \phi} m(B). \tag{14}$$

where Bel(A) indicates amount of belief committed to A based on the given evidence, and Pl(A) represents the maximum extent to which the current evidence allows one to believe A.

In terms of the evidence theory, Bel(A) is thought to be the minimum probability that the hypothesis A is true and Pl(A) is thought to be the maximum probability that the hypothesis A is true. Therefore, the probability P(A) is in between Bel(A) and Pl(A). From the combined belief vector, we can calculate the belief and plausibility of the subsets {Good}, {Charge}, and {Replace}. The subsets are as follows:

$$Bel(\{\text{Good}\}) = m_C(\{\text{Good}\}) \tag{15}$$

$$Pl(\{\text{Good}\}) = m_C(\{\text{Good}\}) + m_C(\{\text{Good, Replace}\}) + m_C(\{\text{Good, Charge}\}) + m_C(\{\text{Good, Charge, Replace}\}) \tag{16}$$

$$Bel(\{\text{Charge}\}) = m_C(\{\text{Charge}\}) \tag{17}$$

$$Pl(\{\text{Charge}\}) = m_C(\{\text{Charge}\}) + m_C(\{\text{Charge, Replace}\}) + m_C(\{\text{Good, Charge}\}) + m_C(\{\text{Good, Charge, Replace}\}) \tag{18}$$

$$Bel(\{\text{Replace}\}) = m_C(\{\text{Replace}\}) \tag{19}$$

$$Pl(\{\text{Replace}\}) = m_C(\{\text{Replace}\}) + m_C(\{\text{Charge, Replace}\}) + m_C(\{\text{Good, Replace}\}) + m_C(\{\text{Good, Charge, Replace}\}) \tag{20}$$

Once the belief and the plausibility of the basic hypothesis are calculated for equations (15)-(20), decision rules can be made. The following is an example of an embodiment of philosophical rules that may govern the health monitoring of the battery and actions thereafter taken. It should be understood that the rules may change depending on an accepted belief or plausibility. The rules are as follows:

(1) to minimize warranty and false alarms so that a battery is not replaced unless there is absolute confidence that that battery requires replacing. The belief subset of Bel({Replace}) is used to indicate replacement of the battery.

(2) If the indication is that there is exists a low charge in the battery is and since it is not harmful to charge the battery, the plausible action to take is to use the plausible subset of Pl({Charge}) as the indication of a re-charge.

(3) If the belief is that no action is to be taken unless it is confident that the battery is good, the belief is to use the belief subset of Bel({Good}) as the indication of good.

Figure 6:
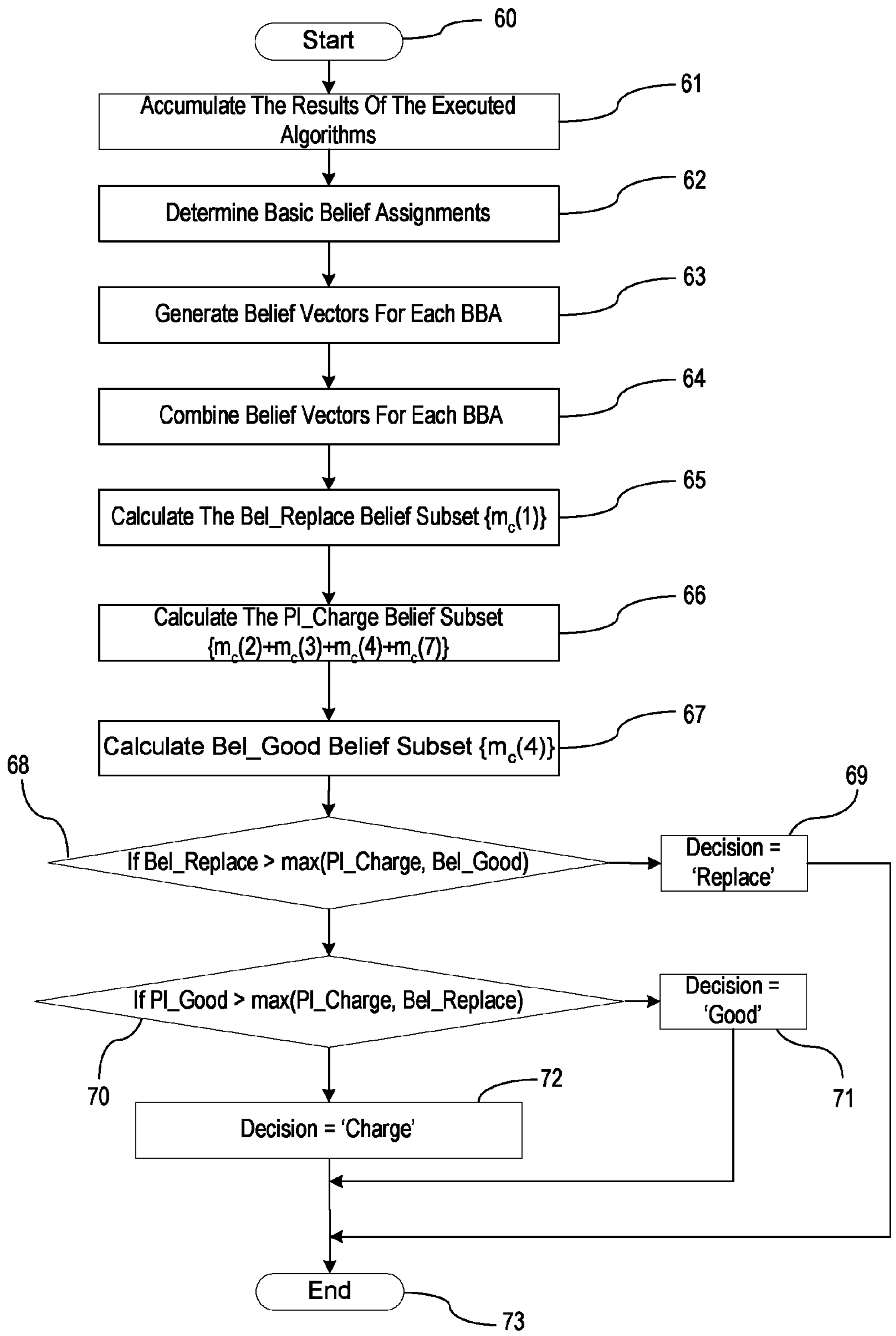
FIG. 6 is a flowchart of a method of the battery health monitoring diagnostic according to the embodiment of the invention.

Based on the established decision rules for this embodiment, the decision as to which action to take is made according to the method identified in the flow chart of FIG. 6 (specifically steps 64-73). In step 60, the battery health monitoring algorithms are executed. In step 61, the results of each of the executed health monitoring algorithms are accumulated.

In step 62, the basic belief assignments are determined for each signature is determined. In step 63, belief vectors are generated for each basic belief assignment signature.

In step 64, the combined belief vectors are read and compared. In step 65, the belief subset Bel({Replace}) is calculated. In step 66, plausible subset Pl({Charge}) is calculated. In step 67, belief subset Bel({Good}) is calculated.

In step 68, a determination is made whether the belief subset Bel({Replace}) is greater than each of the plausible subset Pl({Charge}) and the subset Bel({Good}). If the Bel({Replace}) is greater than both Pl({Charge}) and Bel({Good}), then the routine proceeds to step 69 where the decision is made indicate a "Replace" battery status. Otherwise, the routine proceeds to step 70.

In step 70, a determination is made whether the plausible subset Pl({Charge}) is greater than each of the belief subset Bel({Replace}) and the subset Bel({Good}). If the Pl({Charge}) is greater than both Bel({Replace}) and Bel({Good}), then the routine proceeds to step 71 where the decision is made to indicate a "Good" battery status. Otherwise, the routine proceeds to step 72 to where the decision is made to indicate a "Charge" battery status. In step 73, the routine ends.

FIGS. 7-12 illustrate the principles of battery health monitoring for determining the basic belief assignments of each algorithm. Different cranking signatures of batteries provide evidence of State of Charge (SOC), State of Function (SOF), and State of Health (SOH). The goal of the battery health monitoring is to inform the driver via a status indicator or provide the information to a battery control module for further action. The three actions described herein are: (1) battery is 'Good' and no action is required; (2) 'Charge' the battery; and (3) 'Replace' the battery.

The required actions are determined from the SOC, SOF, and SOH and indicated in a battery state space defined as a two dimensional plane with X-axis being the SOH and the Y-axis being the SOC as shown in FIG. 6. The SOF increases toward upper right corner of the graph and decreases toward lower left corner of the graph. An equal SOF state is indicated as a $SOF_{TH}$ line on the state space.

Figure 7:
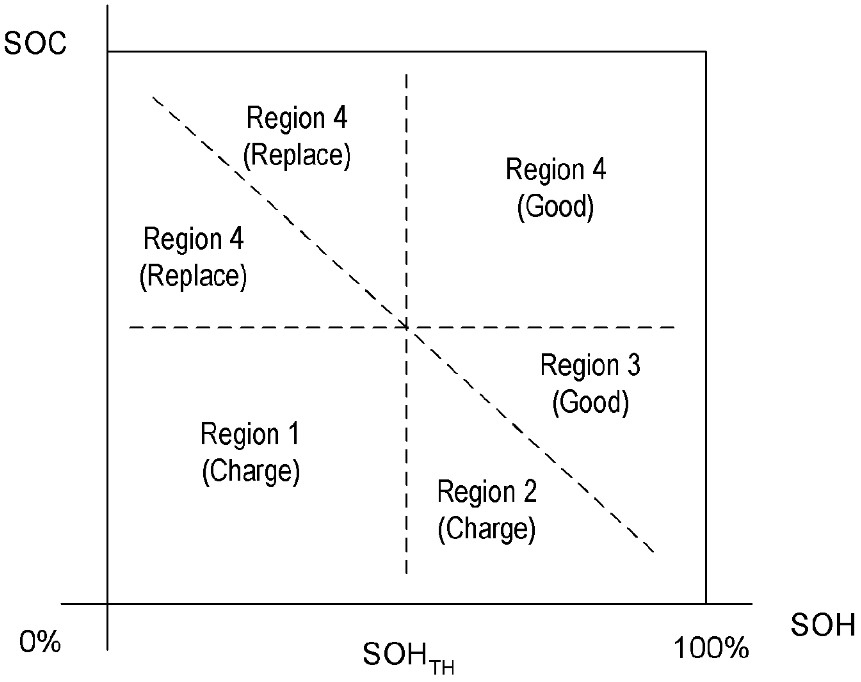
FIG. 7 is a state space diagram according to the embodiment of the invention.

The battery state space is divided into several decision spaces or sub-state spaces according to the required action as shown in FIG. 7. Therefore, a battery health monitoring decision made is based on the region where the battery state is located as a result of the combined vector beliefs.

After dividing and identifying the regions of the battery state space and their respective actions to take, an appropriate action can be determined for mapping each BBA signature. Any single signature cannot exactly determine the action; however, a combination of different signatures can determine both the region and the action where battery state belongs. It was discussed earlier that a single signature possesses some uncertainty, but combining different signatures can reduce the uncertainty. This can be done by evidence theory.

FIGS. 8-10 represent the determination of the BBA for the SOC. SOC is defined as the remaining charge over available capacity as a percentage, and is calculated from a respective SOC algorithm. The SOC information determines whether the battery state is in the upper or the lower region of the battery state space in FIG. 7. The respective SOC subsets of which should be assigned a value greater than zero is determined based on the following interpretations:

At a high SOC the battery does not need to be charged. Therefore, a possible decision is either ‘Replace’ or ‘Good’ and a high belief mass is assigned to the set {‘Replace’, ‘Good’}. This exactly agrees the state space diagram in FIG. 7.

At a low SOC, the effect of low SOH and low SOC are very similar. As a result, a decision should not be made to replace the battery at a low SOC. Therefore the possible decision is either ‘Charge’ or ‘Good’, and a high belief mass is assigned to the set {‘Charge’, ‘Good’}. This exactly agrees the state space diagram in FIGS. 7.

The above statements are realized into basic belief assignment as shown in FIGS. 8-9. The variables $\alpha$ and $\beta$ are obtained from the graph in FIG. 8. At $SOC_{TH}$, $\alpha$ and $\beta$ have a same value of 0.5. As SOC increases, $\alpha$ increases and $\beta$ decreases. In addition to $\alpha$ and $\beta$, uncertainty factor $\gamma$, which indicates the level of uncertainty of SOC value, is chosen in between (0,1). The belief masses $\alpha(1-\gamma)$, $\beta(1-\gamma)$, and $\gamma$, are assigned to the subsets {‘Replace’, ‘Good’}, {‘Charge’, ‘Good’}, and {‘Replace’, ‘Charge’, ‘Good’} as shown in FIG. 9. The mathematical expressions of $\alpha$ and $\beta$ are as follows:

$$\alpha = \frac{1}{2}\underset{[0,1]}{sat}\left(\frac{SOC}{SOC_{Th}}\right) + \frac{1}{2}\underset{[0,1]}{sat}\left(\frac{SOC - SOC_{Th}}{100 - SOC_{Th}}\right) \quad (28)$$

$$\beta = 1 - \alpha \quad (29)$$

After obtaining the belief variables $\alpha$, $\beta$, and $\gamma$, the basic believes are assigned to the belief vector shown in Table 3 shown in FIG. 10.

FIGS. 11-13 represent the determination of the BBA for the SOF. State of function (SOF) is the ability of the battery to crank the engine. Cranking power is one indication for SOF. High SOF implies high SOC or high SOH or both. Low SOF implies low SOC or low SOH or both. Therefore the SOF determines whether the battery state is in the upper right region or lower left region of the battery state space in FIG. 7. The respective SOF subsets of which should be assigned a value greater than zero is determined based on the following interpretations:

At a high SOF the battery does not need to be charged. Therefore possible decision is either ‘Replace’ or ‘Good’ and a high belief mass is assigned to the set {‘Replace’, ‘Good’}. This exactly agrees the state space diagram in FIG. 7.

At a low SOF the battery needs to be charged or replaced. Therefore possible decision is either ‘Charge’ or ‘Replace’ and a high belief mass is assigned to the set {‘Charge’, ‘Replace’}. This exactly agrees the state space diagram in FIG. 7.

The above statements are realized into basic belief assignment as shown in FIG. 11. The $SOF_H$, the $SOF_L$, and $SOF_{TH}$ are the maximum, minimum, and threshold value of SOF, respectively. The variables $\alpha$ and $\beta$ are obtained from the graph in FIG. 11. As SOF increases, $\alpha$ increases and $\beta$ decreases. At $SOF_{TH}$, $\alpha$ and $\beta$ have the same value of 0.5. In addition to $\alpha$ and $\beta$, uncertainty factor $\gamma$, which indicates the level of uncertainty of SOF, is chosen in between (0,1). The belief masses $\alpha(1-\gamma)$, $\beta(1-\gamma)$, and $\gamma$, are assigned on the subsets {‘Replace’, ‘Good’}, {‘Charge’, ‘Replace’}, and {‘Replace’, ‘Charge’, ‘Good’} as shown in FIG. 12.

The mathematical expressions of $\alpha$ and $\beta$ are as follows:

$$\alpha = \frac{1}{2}\underset{[0,1]}{sat}\left(\frac{SOF - SOF_L(T)}{SOF_{Th}(T) - SOF_L(T)}\right) + \frac{1}{2}\underset{[0,1]}{sat}\left(\frac{SOF - SOF_{Th}(T)}{SOF_H(T) - SOF_{Th}(T)}\right) \quad (30)$$

$$\beta = 1 - \alpha \quad (31)$$

After obtaining the belief variables $\alpha$, $\beta$, and $\gamma$, the basic believes are assigned to the belief vector shown in Table 4 of FIG. 13.

FIGS. 14-16 represent the determination of the BBA for the SOH. There are several different aspects of SOH of a battery. These aspects are reserve capacity, minimum voltage, cranking resistance, etc. Each algorithm determines battery SOH from each signature. The respective SOH subsets of which should be assigned a value greater than zero is determined based on the following interpretations:

At a high SOH, the possible decision is either ‘Charge’ or ‘Good’ and high belief mass is assigned to the set {‘Charge’, ‘Good’}.

At a low SOH, the possible decision is either ‘Charge’ or ‘Replace’ and high belief mass is assigned to the set {‘Charge’, ‘Replace’}.

The above statements are realized into basic belief assignment as shown in FIG. 14. The variables $\alpha$ and $\beta$ are obtained from the graph of FIG. 14. As SOH increases, $\alpha$ increases and $\beta$ decreases. At $SOH_{Th}$, $\alpha$ and $\beta$ have the same value of 0.5. In addition to $\alpha$ and $\beta$, uncertainty factor $\gamma$, which indicates the level of uncertainty of the cranking power, is chosen in between (0,1). The belief masses $\alpha(1-\gamma)$, $\beta(1-\gamma)$, and $\gamma$, are assigned on the subsets {‘Charge’, ‘Good’}, {‘Charge’, ‘Replace’}, and {‘Replace’, ‘Charge’, ‘Good’} as shown in FIG. 15.

The mathematical The mathematical expressions of $\alpha$ and $\beta$ are as follows:

$$\alpha = \frac{1}{2}\underset{[0,1]}{sat}\left(\frac{SOH - SOH_L}{SOH_{Th} - SOH_L}\right) + \frac{1}{2}\underset{[0,1]}{sat}\left(\frac{SOH - SOH_{Th}}{SOH_H - SOH_{Th}}\right) \quad (32)$$

$$\beta = 1 - \alpha \quad (33)$$

After obtaining the belief variables $\alpha$, $\beta$, and $\gamma$, the basic believes are assigned to the belief vector shown in Table 5 of FIG. 16.

While certain embodiments of the present invention have been described in detail, those familiar with the art to which this invention relates will recognize various alternative designs and embodiments for practicing the invention as defined by the following claims.

What is claimed is:

1. A method for fusing a plurality of self-contained diagnostics for generating a combined state of belief for a monitored system, the method comprising:

executing a plurality of predetermined diagnostic states of self-contained diagnostic routines, each self-contained routine generating a respective state of belief result for the monitored system;

formulating respective belief vectors as a function of belief results of the executed plurality of predetermined diagnostic states;

providing a state space including a plurality of sub-state spaces, each of the sub-state spaces representative of the predetermined diagnostic states of the monitored system;

assigning each belief vector to the sub-state spaces of the state space;

fusing each of the belief vectors of each sub-state space;

determining a combined belief value for each fused sub-state space;

comparing the combined belief values of each fused sub-state space;

identifying the sub-state space having the highest combined belief value.

2. The method of claim 1 wherein the state of belief is selected from a binary condition state.

3. The method of claim 1 wherein the step of formulating the belief vectors includes converting the accumulated results to a comparable standard.

4. The method of claim 1 wherein the step of fusing the each of the belief vectors includes combining each belief vector within a respective sub-state space.

5. The method of claim 1 wherein the step of determining the belief value includes generating a belief value associated with each respective sub-state space of the state space.

6. The method of claim 1 the step of identifying the sub-state space having the highest combined belief value includes summing the combined belief values of each of the respective sub-state spaces and determining which respective sub-state space includes a highest belief value.

7. The method of claim 1 wherein the self-contained diagnostic comprises a diagnostic for a vehicle-related monitoring system.

8. The method of claim 7 wherein the vehicle related monitoring system includes a battery monitoring system.

9. The method of claim 8 wherein the self-contained diagnostic for the battery monitoring system includes state of health monitoring routines.

10. The method of claim 8 wherein the self-contained diagnostic for the battery monitoring system includes state of charge monitoring routines.

11. The method of claim 8 wherein the self-contained diagnostic for the battery monitoring system includes state of function monitoring routines.

12. The method of claim 8 wherein the self-contained diagnostic for the battery monitoring system includes at least one of a state of health monitoring routine, a state of charge monitoring routine, and a state of function monitoring routines.

13. The method of claim 8 wherein at least one of the sub-state spaces is identifiable with a fully charged battery state, wherein a charged battery message is provided in response to highest combined belief value being associated with the fully charged battery state.

14. The method of claim 8 wherein at least one of the sub-state spaces is identifiable with a re-charge battery state, where a re-charge battery message is provided in response to the highest combined belief value being associated with the recharged battery state.

15. The method of claim 8 wherein at least one of the sub-state spaces is identifiable with a replace battery action, wherein a replace battery message is provided in response to the highest combined belief value being associated with the replace battery action sub-state space.

16. A diagnostic system for a vehicle-related system comprising:

at least one sensor for monitoring a characteristic of a vehicle-related sub-system; and a processing unit for executing a plurality of vehicle system-related monitoring routines, the processing unit identifying a state of belief for each monitoring routine and assigning a belief vector to one of a plurality of battery sub-state spaces within a state space;

a fusing framework for combining the results of each of the executed monitoring routines for each respective sub-state space, the fusing framework determining a combined belief value of each fused sub-state space, the fusing framework identifying the sub-state having the highest combined belief value.

17. The system of claim 16 further comprising a status indicator, the status indictor providing a message to a driver of a vehicle indicating a state of condition of the respective monitored system.

18. The system of claim 16 wherein the message provides a recommended corrective action for maintenance of the battery.

19. The system of claim 16 further wherein the vehicle-related system comprises a vehicle battery monitoring system.

20. The system of claim 19 further wherein the processing unit and the fusing framework are integrated as part of a battery control module.

* * * * *